United States Patent
Dentamaro et al.

(10) Patent No.: US 10,075,575 B2
(45) Date of Patent: Sep. 11, 2018

(54) DEVICE FOR CONNECTING A PHONE TO A VEHICLE

(71) Applicant: VOXX INTERNATIONAL CORPORATION, Hauppauge, NY (US)

(72) Inventors: Joseph Dentamaro, St. Clair Shores, MI (US); Joseph Santavicca, Macomb, MI (US); Shane Wilson, Clinton Township, MI (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 15/608,394

(22) Filed: May 30, 2017

(65) Prior Publication Data

US 2017/0346934 A1   Nov. 30, 2017

Related U.S. Application Data

(60) Provisional application No. 62/343,378, filed on May 31, 2016.

(51) Int. Cl.
*H04B 7/00* (2006.01)
*H04M 1/60* (2006.01)

(52) U.S. Cl.
CPC .................. *H04M 1/6091* (2013.01)

(58) Field of Classification Search
CPC .............. H04M 1/6091; H04M 1/0283; H04B 5/0031; H04W 4/008
See application file for complete search history.

(56) References Cited

U.S. PATENT DOCUMENTS

| | | | |
|---|---|---|---|
| 2013/0137372 A1* | 5/2013 | Nishidai | H04B 5/00 455/41.1 |
| 2014/0024312 A1* | 1/2014 | Guida | H04W 4/008 455/41.2 |
| 2014/0273822 A1* | 9/2014 | Gutierrez | H04B 5/0031 455/41.1 |
| 2017/0120867 A1* | 5/2017 | Beauvais | B60R 25/24 |

\* cited by examiner

*Primary Examiner* — Tuan Pham
(74) *Attorney, Agent, or Firm* — F. Chau & Associates, LLC

(57) ABSTRACT

A device for connecting a phone to a vehicle, the device including: a case, the case including: a long-range radio frequency (RF) transceiver for communication with a control device in a vehicle via a long-range wireless link; and a short-range bluetooth (BT) transceiver for communicating with a smartphone via a short-range wireless link, wherein the case is configured to be attached to an external surface of the smartphone, and wherein the device is configured to relay commands from the smartphone to the vehicle.

5 Claims, 7 Drawing Sheets

DEVICE FOR CONNECTING A PHONE TO A VEHICLE

CROSS-REFERENCE TO RELATED APPLICATION

This application claims priority under 35 U.S.C. § 119/120 to U.S. provisional application No. 62/343,378, filed on May 31, 2016 in the U.S. Patent and Trademark Office, the disclosure of which is incorporated by reference herein in its entirety.

SUMMARY

According to an exemplary embodiment of the present invention, there is provided a device for connecting a phone to a vehicle, the device including: a case, the case including: a long-range radio frequency (RF) transceiver for communication with a control device in a vehicle via a long-range wireless link; and a short-range bluetooth (BT) transceiver for communicating with a smartphone via a short-range wireless link, wherein the case is configured to be attached to an external surface of the smartphone, and wherein the device is configured to relay commands from the smartphone to the vehicle.

DETAILED DESCRIPTION OF EXEMPLARY EMBODIMENTS

According to an exemplary embodiment of the present invention there is provided a device for connecting a phone to a vehicle. The device can be used to in place of a traditional vehicle key fob. For example, the device can be attached to a smartphone and used to extend the communication range of the smartphone. More specifically, the smartphone will communicate a message via a short-range communication protocol such as Bluetooth (BT), near-field communication (NFC), WiFi or ANT to the device. The device will then relay the message sent from the smartphone to a vehicle via a long-range communication protocol such as radio frequency (RF), particularly ultra high frequency (UHF), LORA, Zigbee and WiFi. Conversely, the vehicle can communicate a message to the device via RF and the device can transmit the message via BT to the smartphone.

Figure 1:
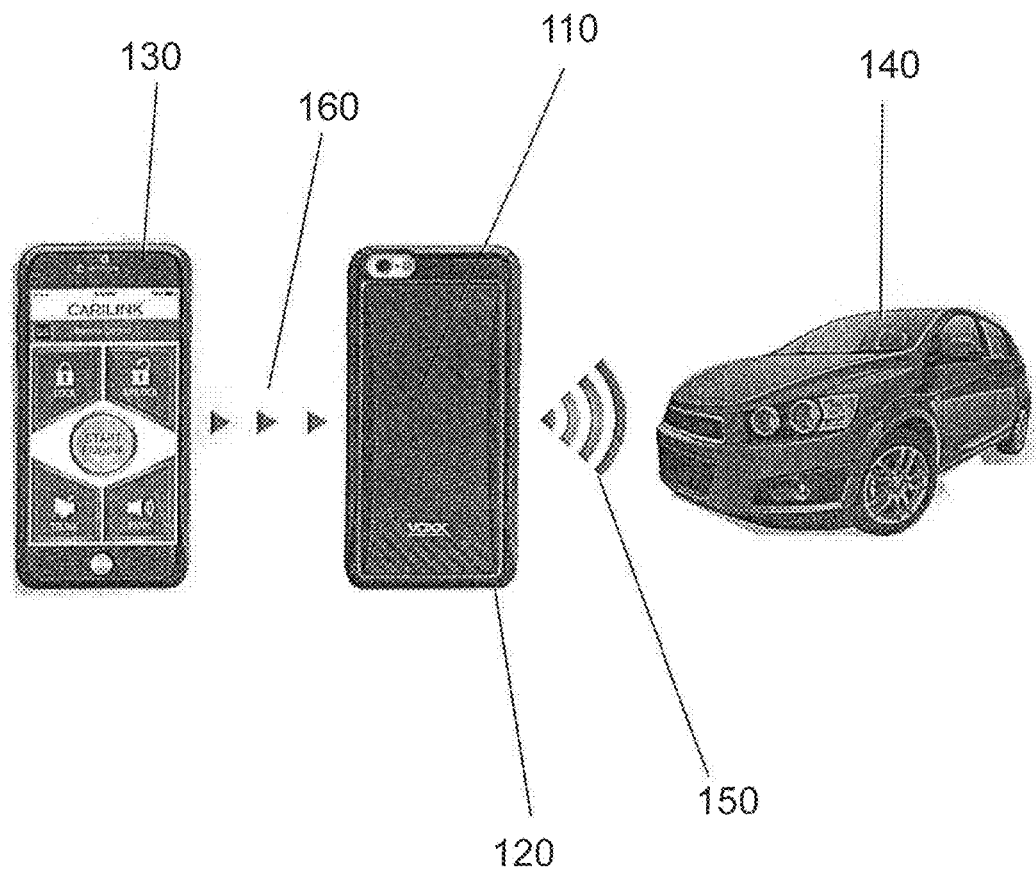
FIG. 1 shows a case-embedded device for connecting a phone to a vehicle according to an exemplary embodiment of the present invention.
Figure 2:
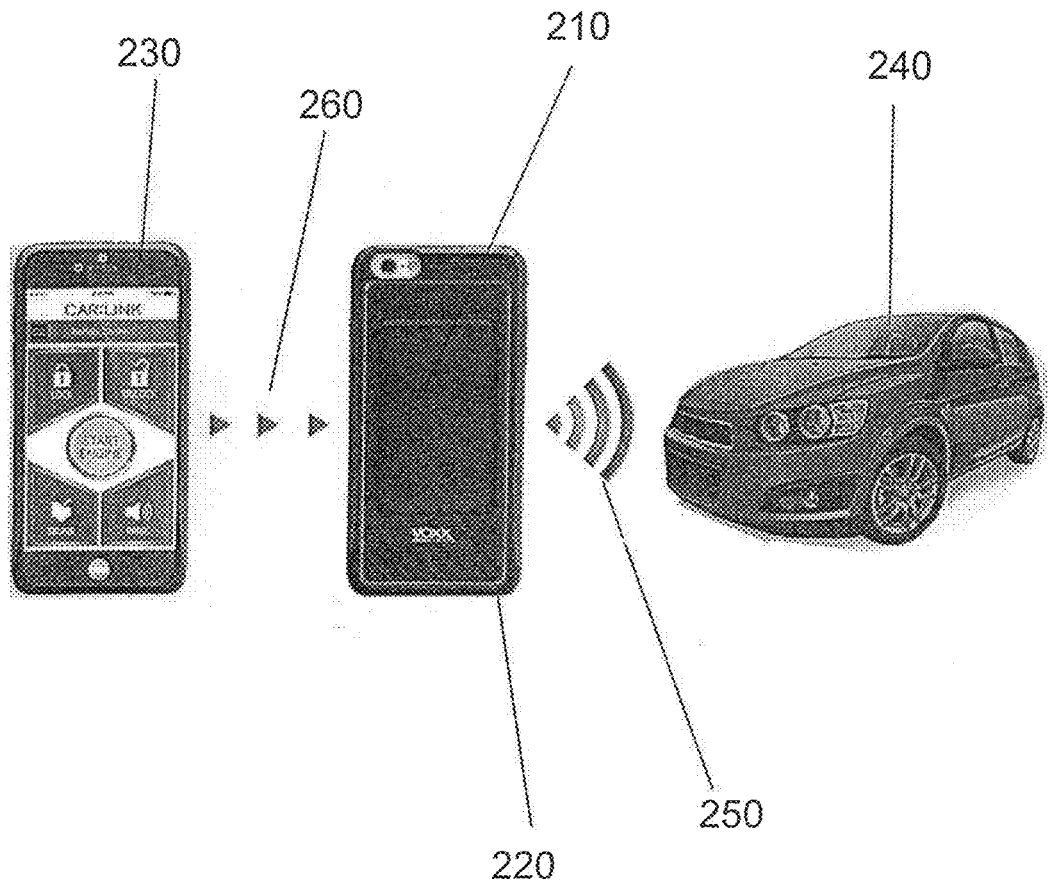
FIG. 2 shows a snap-in-the-case device for connecting a phone to a vehicle according to an exemplary embodiment of the present invention.
Figure 3:
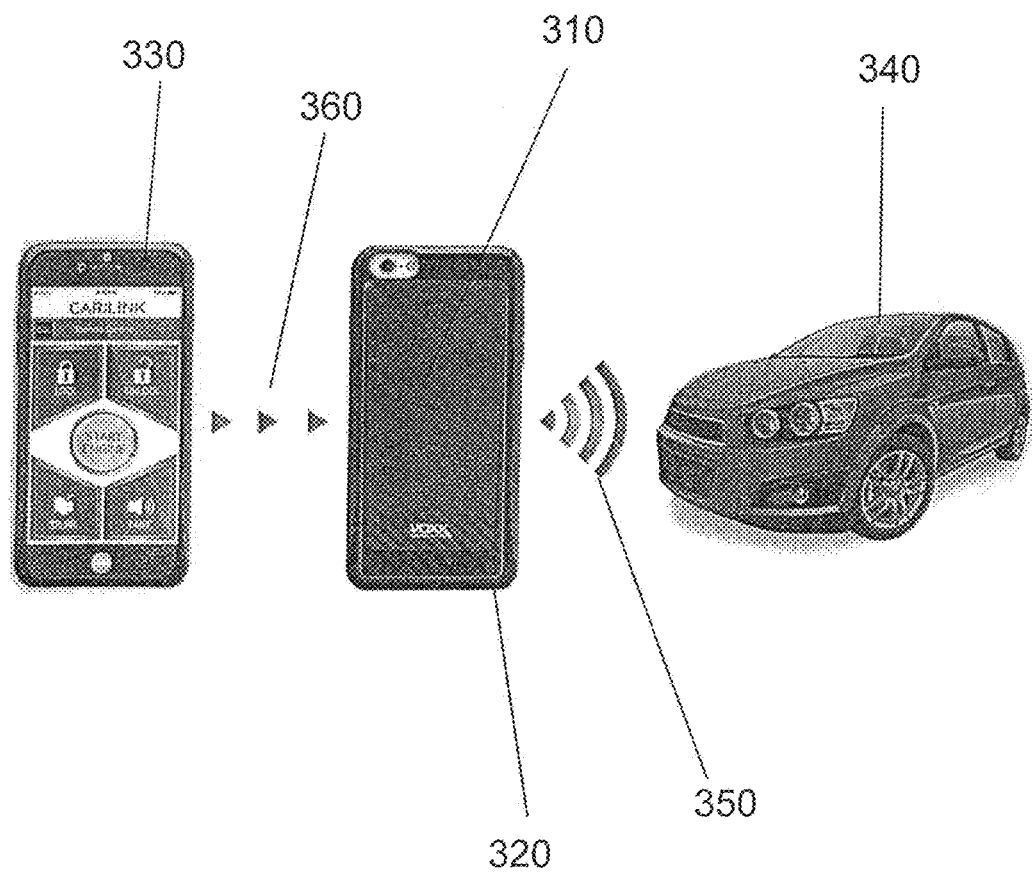
FIG. 3 shows a stick-on-the-case device for connecting a phone to a vehicle according to an exemplary embodiment of the present invention.

The device can be connected to the smartphone in a variety of ways. For example, FIG. 1 shows the device 110 embedded in a case 120 of a smartphone 130. FIG. 2 shows the device 210 snapped into a case 220 of a smartphone 230. FIG. 3 shows the device 310 attached by sticking it on (e.g., by using tape) a case 320 of a smartphone 330. In other words, the device can be physically attached to a smartphone or a smartphone case.

The device (110, 210, 310) itself may include a long-range RF transceiver and a short-range BT transceiver. The RF transceiver is used for sending commands to a control device in a vehicle (140, 240, 340) for controlling vehicle functions including but not limited to locking the doors, unlocking the doors, opening the trunk, or remote starting the engine. The RF transceiver may also receive commands and/or status updates from the control device in the vehicle (140, 240, 340) that are to be communicated to the smartphone (130, 230, 330). As shown in FIGS. 1-3, the device (110, 210, 310) and the vehicle (140, 240, 340) communicate via a long-range wireless link (150, 250, 350) and the device (110, 210, 310) and the smartphone (130, 230, 330) communicate via a short-range wireless link (160, 260, 360).

The BT transceiver allows the device (110, 210, 310) to communicate with the smartphone (130, 230, 330) via the wireless link (160, 260, 360). For example, the device (110, 210, 310) will receive commands from the smartphone (130, 230, 330) via the wireless link (160, 260, 360) and relay them to the vehicle (140, 240, 340) via the wireless link (150, 250, 350). The commands may be entered through an interface on a display of the smartphone (130, 230, 330). The device (110, 210, 310) may also receive confirmations and/or status updates from the vehicle (140, 240, 340) via the wireless link (150, 250, 350) and relay them to the smartphone (130, 230, 330) via the wireless link (160, 260, 360). The confirmations and/or status updates may be shown on the display of the smartphone (130, 230, 330).

The smartphone (130, 230, 330) is a mobile phone built on a mobile operating system. The display of the smartphone (130, 230, 330) may be a touchscreen and have a web browser that displays standard web pages as well as mobile-optimized sites. High-speed data access may be provided by Wi-Fi and mobile broadband. The smart phone (130, 230, 330) can make and receive telephone calls by connecting to a cellular network with its own RF transceiver. Web pages may be displayed on the display under control of a central processing unit (CPU) and memory of the smartphone (130, 230, 330).

Other than a smart phone, a mobile device such as a handheld computing device having a display screen with touch input and/or a miniature keyboard may be used in accordance with an exemplary embodiment of the present invention. The mobile device may also be a laptop computer or a tablet.

When the smartphone (130, 230, 330) has an application installed that permits it to be used in place of an electronic key fob to lock and unlock doors, control a car find feature (e.g., audible horn honk), start a vehicle remotely, or program auxiliary outputs (e.g., trunk release), the display may show a variety of icons related to key fob functionality. For example, an individual icon may be shown for each of lock, unlock, find and start functions and may be responsive to user touch. The application may further enable a user to get vehicle diagnostic information or set preferences by way of the display.

The vehicle (140, 240, 340) may include an RF transceiver for communicating with the device (110, 210, 310). The vehicle (140, 240, 340) may include a control unit that includes a memory and CPU. The control unit may be an embedded system that controls one or more of the electrical system or subsystems in the vehicle (140, 240, 340). The control unit may be a vehicle security pre-load module. As an example, the control unit may be part of a remote keyless entry system, passive entry or push-button start system.

A remote keyless entry system may refer to a lock that uses an electronic remote control as a key which is activated by a handheld device or automatically by proximity. A passive entry system or push button start system may include a key that allows a driver to keep the key in their pocket when unlocking, locking and starting a vehicle. The device (110, 210, 310) of the present invention may be used with either of these systems.

When the device (110, 210, 310) is connected to the smartphone (130, 230, 330) or when the device (110, 210, 310) is in close proximity to the smartphone (130, 230, 330), it can be paired with the smartphone (130, 230, 330). The pairing process may be a BT pairing process between the device (110, 210, 310) and the smartphone (130, 230, 330). This may be effectuated by pressing the pairing button 410 (see FIG. 4) on the device (110, 210, 310) when the device (110, 210, 310) is sufficiently close enough to the smartphone (130, 230, 330). A pairing light emitting diode (LED) 420 on the device (110, 210, 310) may light up when the device (110, 210, 310) is paired with the smartphone (130, 230, 330).

The device (110, 210, 310) is also programmed to the remote start or alarm installed in the vehicle (140, 240, 340). This programming may be done like a standard remote transmitter. For example, by entering a vehicle program mode to learn the device (110, 210, 310).

Once paired and programmed, vehicle commands entered via the display of the smartphone (130, 230, 330) will be routed through the device (110, 210, 310) to the vehicle (140, 240, 340). In other words, signals representing the commands will be transmitted from a BT transceiver of the smartphone (130, 230, 330) to the BT transceiver of the device (110, 210, 310). The BT transceiver of the device (110, 210, 310) will then transmit the command-representative signals to the RF transceiver of the vehicle (140, 240, 340). In other words, the device receives the BT communication from the phone and translates the BT communication to a UHF or similar RF range formatted to be received by the module in the vehicle. The RF transceiver of the vehicle (140, 240, 340) will then route these signals to the control unit so that the corresponding function can be executed. This way, when the smartphone (130, 230, 330) is not in BT range of the vehicle (140, 240, 340), commands are transmitted to the vehicle (140, 240, 340) by the device (110, 210, 310). Accordingly, a user does not have to carry their factory key fob to communicate, e.g., door lock, unlock commands, to a vehicle when they are beyond the BT range of their smartphone.

Figure 4:
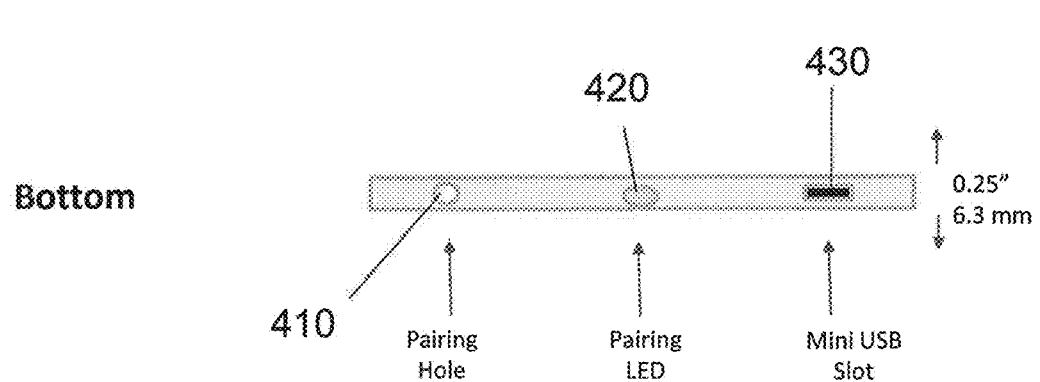
FIG. 4 shows a bottom and a back of a stick-on-the-case device for connecting a phone to a vehicle according to an exemplary embodiment of the present invention.
Figure 4:
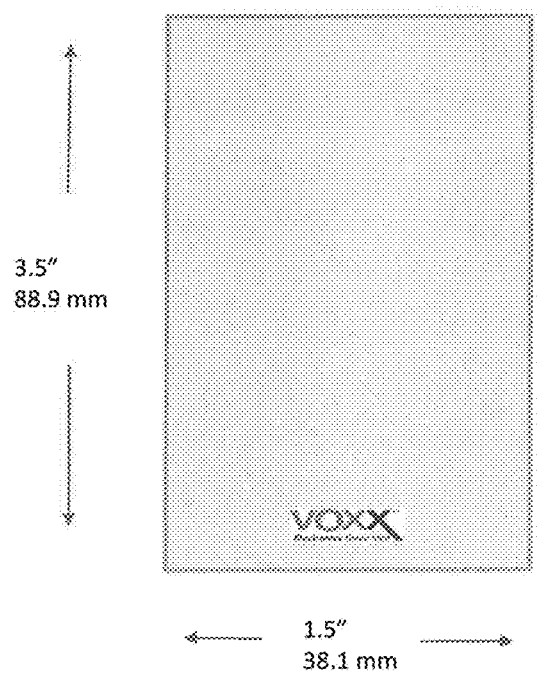
Figure 5:
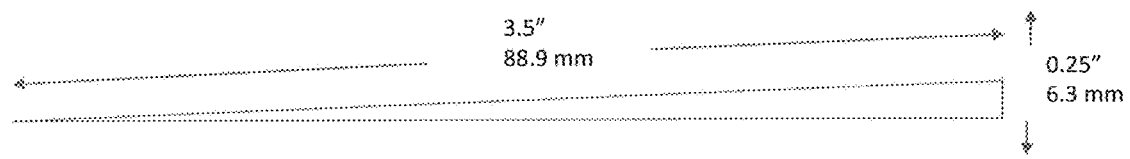
FIG. 5 shows a profile of a stick-on-the-case device for connecting a phone to a vehicle according to an exemplary embodiment of the present invention.
Figure 6:
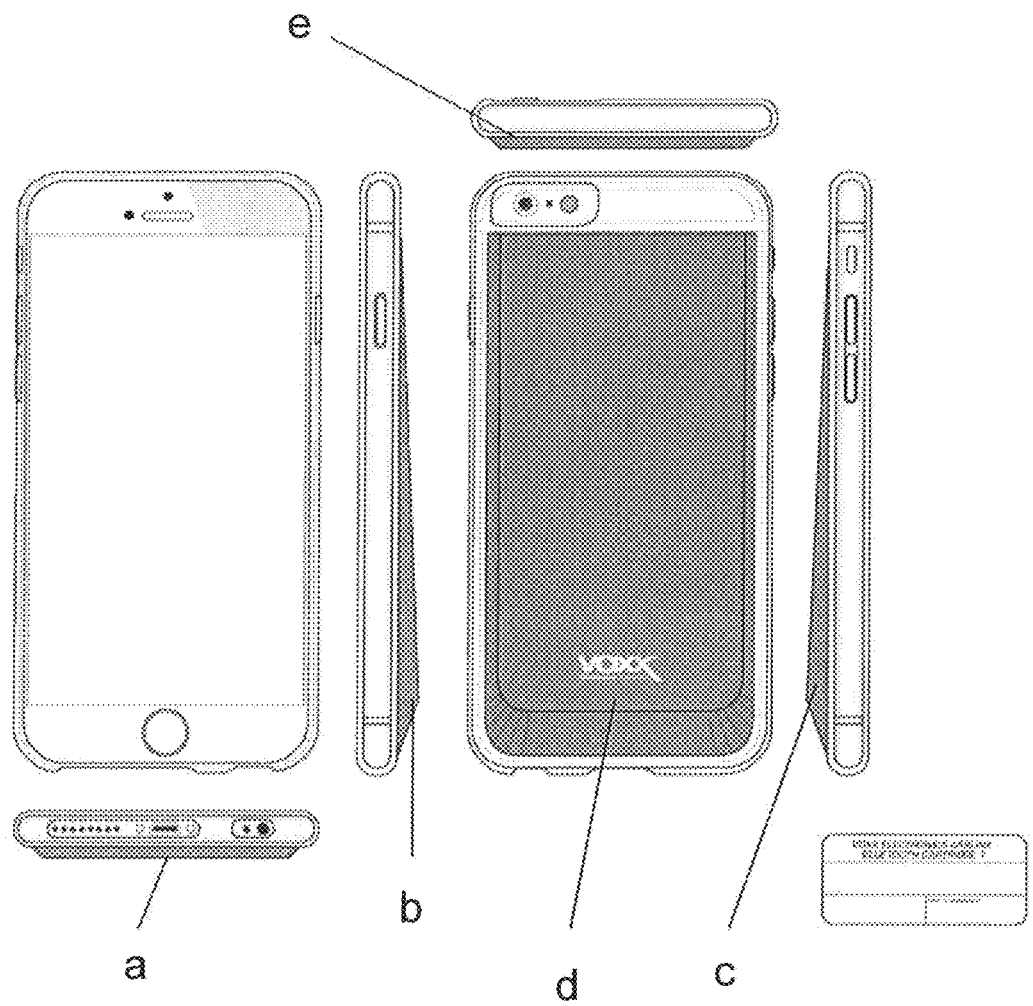
FIG. 6 shows plural views of a stick-on-the case device for connecting a phone to a vehicle according to an exemplary embodiment of the present invention.

As can be seen, the device (110, 210, 310) is essentially a circuit that physically attaches to a phone or a phone case, links to the phone via BT (or NFC), and generates a typical RKE/security/remote start signal via UHF. This can be a two-way system as well. The device (110, 210, 310) may further include a charging port 430 and be shaped and dimensioned as shown in FIGS. 4 and 5. Further, the attached BT/UHF device can have buttons such as an unlock button to access the vehicle in case the phone battery is dead. This is so, because the BT/UHF device is independently powered. For example, the device may be battery powered and have a smart charge detect circuit for wireless charging. FIG. 6 illustrates exemplary views (a—bottom side, b—right side, c—left side, d—back side and e—top side) of the device (110, 210, 310).

The RKE/security/remote start module in the vehicle (140, 240, 340) responds to commands such as lock, unlock, start, stop, panic, etc . . . as long as the security ID and format from the transmitter fob matches that which is stored in the module in the vehicle (140, 240, 340). The device (110, 210, 310) according to an exemplary embodiment of the present invention is designed to work with a multitude of module types which may have different transmitter formats, encryption methods, frequencies, command and response data, and encoding methods.

In an exemplary embodiment of the present invention, a user will have a user account to link the smartphone (130, 230, 330) and attached device (110, 210, 310) to the user. This information will be used to create a configuration process and security ID that makes the attached device (110, 210, 310) compatible with the module in the vehicle (140, 240, 340). The linkage method can include using the media access control (MAC) address of the BT chip in the device (110, 210, 310) and some fixed ID number associated with the smartphone (130, 230, 330)—so that classic BT pairing is not required to link the smartphone (130, 230, 330) and the attached device (110, 210, 310). The linkage may include MAC and/or an additional ESN programmed or assigned to the device during a manufacturing process.

Once the device (110, 210, 310) and the smartphone (130, 230, 330) are linked through the account, the device (110, 210, 310) can be programmed to the module in the vehicle (140, 240, 340) and the ID will be unique. Further, the user can log into the account, and link a new phone to the device (110, 210, 310) to keep the ID. In addition, IDs and/or formats for multiple vehicles can be added.

Further, the user account can manage revoking vehicle device credentials to disable the phone's connection to a particular vehicle or group of vehicles. In addition, access (e.g., control access) for plural vehicles can be allowed and the activity of this particular access can be tracked. For example, tracked activity might use vehicle ID, cellphone location at time of access, a command sent such as lock, unlock, start, panic, vehicle data access, security system (vehicle access control system) status or mode change.

Figure 7:
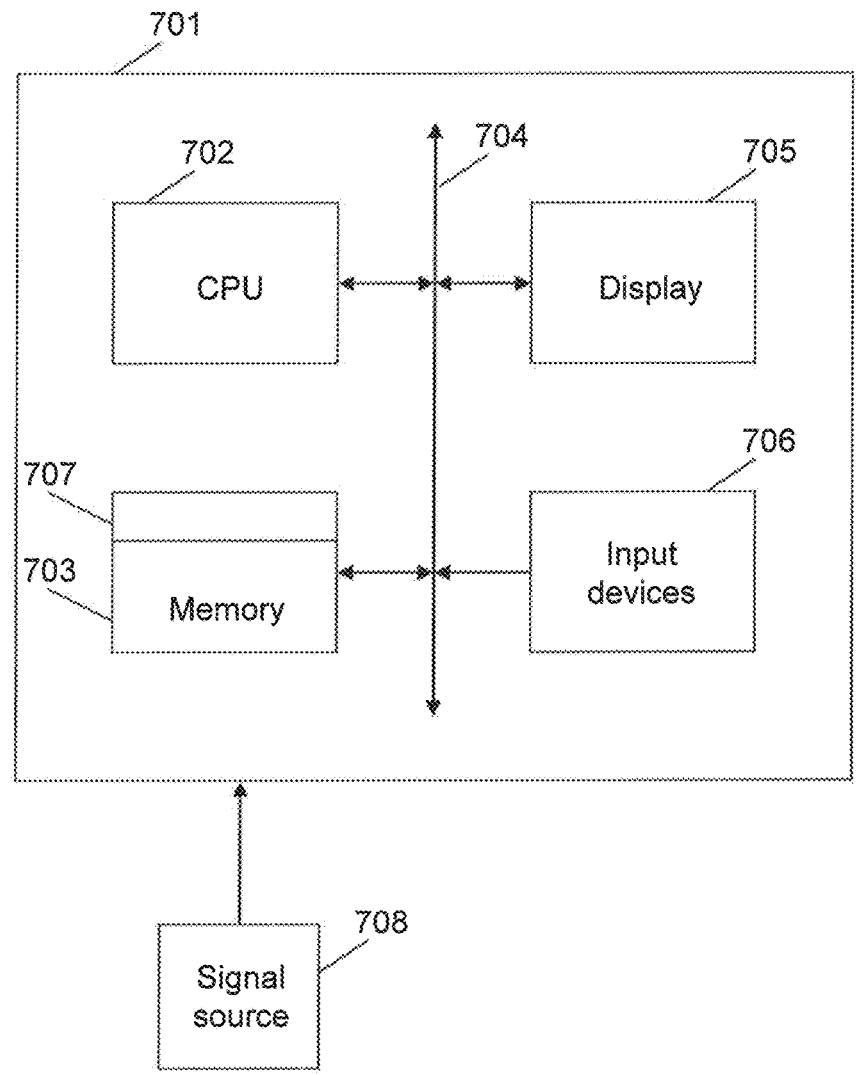
FIG. 7 illustrates a computer system in which an exemplary embodiment of the present invention may be implemented.

Referring now to FIG. 7, according to an exemplary embodiment of the present invention, a computer system 701 can comprise, inter alia, a central processing unit (CPU) 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and a communications bus. The memory 703 can include RAM, ROM, disk drive, tape drive, etc., or a combination thereof. Exemplary embodiments of present invention may be implemented as a routine 707 stored in memory 703 (e.g., a non-transitory computer-readable storage medium) and executed by the CPU 702 to process the signal from a signal source 708. As such, the computer system 701 is a general-purpose computer system that becomes a specific purpose computer system when executing the routine 707 of the present invention.

The computer system 701 also includes an operating system and micro-instruction code. The various processes and functions described herein may either be part of the micro-instruction code or part of the application program (or a combination thereof) which is executed via the operating system. In addition, various other peripheral devices may be connected to the computer system 701 such as an additional data storage device and a printing device. Aspects of the computer system 701 are applicable to the smartphone (130, 230, 330), the device (110, 210, 310) and the controller of the vehicle (140, 240, 340) of FIGS. 1-3.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A device for connecting a phone to a vehicle, the device comprising:
    a housing, the housing including:
        a long-range radio frequency (RF) transceiver for communication with a control device in a vehicle via a long-range wireless link;
        a short-range bluetooth (BT) transceiver for communicating with a smartphone via a short-range wireless link; and
        a pairing button configured to be pressed by a user to initiate a pairing process between the BT transceiver and the smartphone,
    wherein the housing is configured to be physically attached to an external surface of a case that wraps around a back and side edges of the smartphone, and an external surface of the smartphone when the case is not attached to the smartphone, and
    wherein the device is configured to relay commands from the smartphone to the vehicle.

2. The device of claim 1, wherein the housing includes a pairing light that emits light when the BT transceiver is paired with the smartphone.

3. The device of claim 1, wherein the housing includes an input/output interface.

4. The device of claim 1, wherein the housing includes door lock/unlock buttons for locking/unlocking a vehicle door when the smartphone does not have power.

5. The device of claim 1, wherein the housing has a power source separate from a power source of the smartphone.

* * * * *